Oct. 13, 1936.　　　　F. O. DE MILLAR　　　　2,057,086
CONTROLLING APPARATUS FOR FLUID PRESSURE MOTORS
Filed Feb. 20, 1933　　　5 Sheets-Sheet 1

INVENTOR:
Floyd O. De Millar,
By
Chas. M. Nissen,
ATT'Y.

Oct. 13, 1936.  F. O. DE MILLAR  2,057,086
CONTROLLING APPARATUS FOR FLUID PRESSURE MOTORS
Filed Feb. 20, 1933  5 Sheets-Sheet 2

INVENTOR:
Floyd O. DeMillar
BY
Chas. M. Nissen,
ATT'Y.

Oct. 13, 1936.   F. O. DE MILLAR   2,057,086
CONTROLLING APPARATUS FOR FLUID PRESSURE MOTORS
Filed Feb. 20, 1933   5 Sheets-Sheet 5

Fig. 9

INVENTOR:
Floyd O. DeMillar,
By
Chas. M. Nissen,
ATT'Y.

Patented Oct. 13, 1936

2,057,086

UNITED STATES PATENT OFFICE 2,057,086

CONTROLLING APPARATUS FOR FLUID-PRESSURE MOTORS

Floyd O. De Millar, Granville, Ohio, assignor to The Galion Iron Works and Manufacturing Company, a corporation of Ohio Application February 20, 1933, Serial No. 657,663

12 Claims. (Cl. 37—156)

My invention relates to apparatus for controlling the operation of fluid-pressure motors, particularly of the hydraulic type and while I have shown my improvements adapted to road-working machinery, they may have a general application.

One of the objects of my invention is the provision of a system of control for fluid-pressure motors including a continuously operated pump in which system provision is made for permitting the pump to operate at substantially no load when the fluid-pressure motor is inactive.

Another object of the invention is the provision of means for permitting a fluid-pressure pump to be operated continuously at substantially no load when the fluid-pressure motor to which it is connected is inactive and to automatically limit the pressure which can be applied to such fluid-pressure motor.

Another object of the invention is the provision of improved and efficient fluid-pressure motor mechanism for adjusting various parts of a road-working machine and banking the controlling valves in one position at the operator's station to secure quickness and accuracy in the operation of the adjustments.

A further object of the invention is the provision of a manifold for a plurality of controlling valves in a system of control of fluid-pressure motors located at various distances from the manifold.

Another object of the invention is the provision in road-working apparatus of means for controlling from a single operator's station a plurality of hydraulic motors distributed about the machine and automatically limiting the hydraulic pressure which may be exerted in any of the hydraulic motors.

Another object of the invention is the provision in a road grader of controlling apparatus for double acting hydraulic motors distributed about the machine, which controlling apparatus shall include a plurality of valves banked at the operator's station to enable the operator to actuate such valves at such station to effect desired adjustments of various parts of the machine.

Another object of the invention is the provision of hydraulic steering mechanism for a vehicle combined with valve mechanism located at the operator's station at the rear end of the machine for enabling a continuously operated pump to supply pressure whenever desired to effect the steering operation.

A further object of the invention is the provision in a road grader of a plurality of hydraulic motors for adjusting the height and lateral positions of a mold board combined with a plurality of valves at the operator's station at the rear end of the machine to accurately control said hydraulic motors and effect locking thereof in adjusted positions.

Other objects of the invention will appear hereinafter, the novel features and combinations being set forth in the appended claims.

In the accompanying drawings

Figure 1:
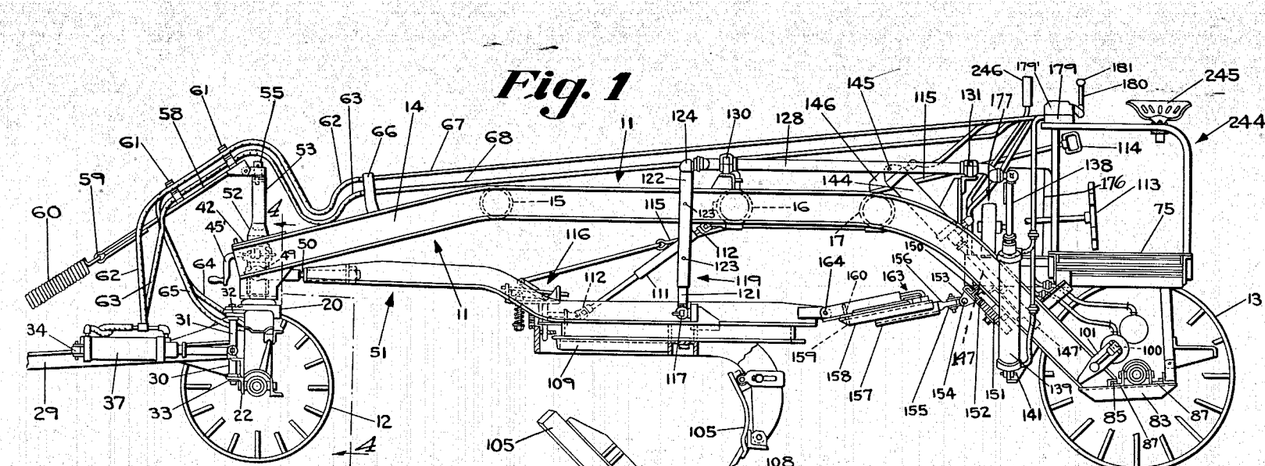
Fig. 1 is an elevation of a road grading machine illustrating one of the adaptations of my improvements.
Figure 2:
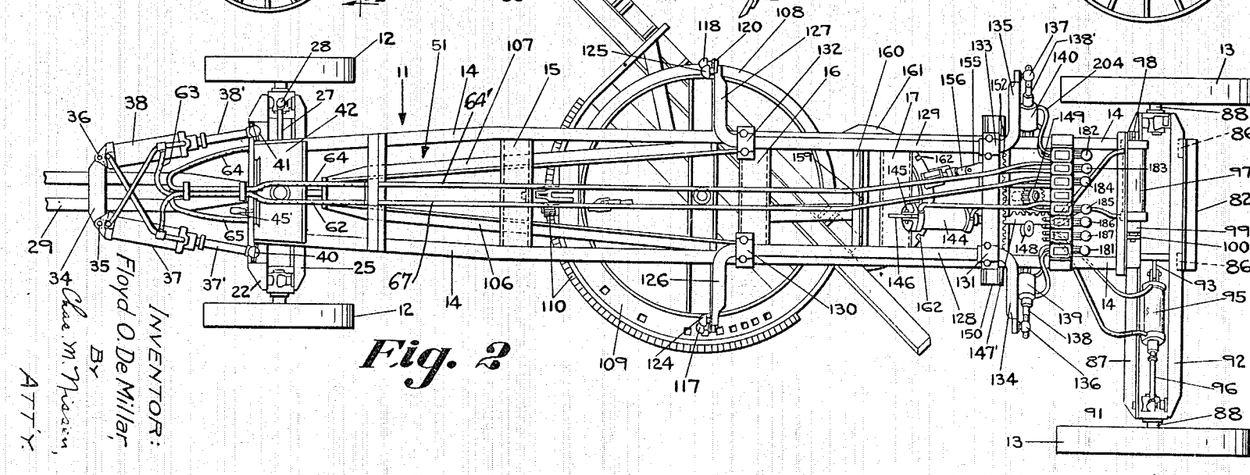
Fig. 2 is a plan view of the structure shown in Fig. 1.

The machine shown in Figs. 1 and 2 comprises a vehicle frame 11 mounted on the front wheels 12, 12 and rear wheels 13, 13. The frame 11 comprises longitudinal spaced-apart beams 14, 14 which are rigidly connected by the tubular cross-pieces 15, 16 and 17.

Figure 4:
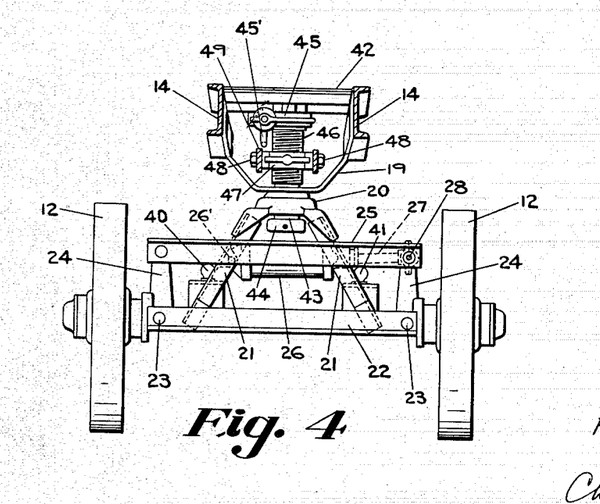
Fig. 4 is an elevational view partly in section taken on the line 4—4 of Fig. 1 looking in the direction of the arrows.

As shown in Fig. 4 the forward ends of the beams 14, 14 are connected by a U-shaped yoke 19 which rests upon a supporting frame 20 having depending angle irons 21, 21 secured at their lower ends to the axle-tree 22 on the ends of which are pivoted at 23, 23 the axles for the front wheels 12, 12. These axles are provided with vertical arms 24, 24 to the upper ends of which are pivoted the cross-piece 25.

Between one of the angle irons 21 and one of the arms 24 is pivotally connected a hydraulic motor comprising a cylinder 26 and a piston rod 27. The cylinder 26 is pivoted at 26' to one of the angle irons 21 and the piston rod 27 is pivoted at 28 to the right-hand vertical arm 24 as viewed in Fig. 4. As hereinafter explained, the hydraulic motor comprising the cylinder 26 is double acting in that the liquid flows into and out of the cylinder on both sides of the piston therein and therefore when the leaning of the wheels 12 is adjusted they may be locked in adjusted positions by closing the valve controlling the flow of the liquid in the cylinder 26.

Figs. 1 and 2 illustrate a pull type grader having a vehicle tongue 29 secured at 30 to a vertical post 31, the upper end of which is pivoted at 32 to the frame 20 and the lower end of which is pivoted at 33 to the front axle-tree 22.

A cross-piece 34 secured to the tongue 29, as shown in Fig. 2, provides at its ends pivotal supports at 35, 36 for the cylinders 37, 38 of hydraulic motors comprising piston rods 37', 38', the outer ends of which are pivoted at 40, 41 to the front axle-tree 22. While in some instances one double acting hydraulic motor comprising a cylinder, a piston and a piston rod may be employed, I prefer to use two hydraulic motors symmetrically arranged as shown in Fig. 2.

As shown in Figs. 1 and 2, a cross plate 42 is secured to the upper sides of the forward ends of the side beams 14, 14 and secured to this plate 42 and depending therefrom is a vertical fixed bearing rod 43, the lower end of which is provided with a retaining cap 44 as shown in Fig. 4. When the hydraulic steering mechanism is operated the frame 20 turns on a vertical axis at the center of the bearing 43.

Secured to the bottom of the plate 42 concentric with the bearing rod 43 is a gear housing 45. When the crank 45' is operated, worm gearing in the housing 45 turns a screw 46 in the nut 47 to which is pivoted at 48, 48 the yoke 49 which in turn is pivoted at 50 to the front end of the drawbar 51. It will thus be seen that by turning the crank 45' the front end of the drawbar may be elevated or lowered relative to the main frame 11.

Secured to the top of the plate 42 is a socket 52 in which is mounted a vertical post 53 which may be held rigidly in vertical position by means of any desired construction. To the top of the post 53 is pivotally connected at 55 the inclined plate 58, the forward end of which is secured to the loop 59 and the latter connected to a spring 60 which is connected at its front end to the tongue 29.

Clips 61, 61 are relied on to secure four flexible conduits 62, 63 and 64, 65 to the plate 58. The conduits 62, 63 are connected to the steering motors 37 and 38 and the conduits 64, 65 are connected to the motor 26 for adjusting the leaning of the front wheels 12.

Mounted on a cross-piece 66 on the forward portion of the frame 11 are two metal pipes 67 and 68 which are respectively connected to the flexible conduits 62 and 63. The metal pipes 67 and 68 extend to the rear portion of the frame 11 where they are connected directly to the valve manifold as hereinafter more fully explained.

Figure 3:
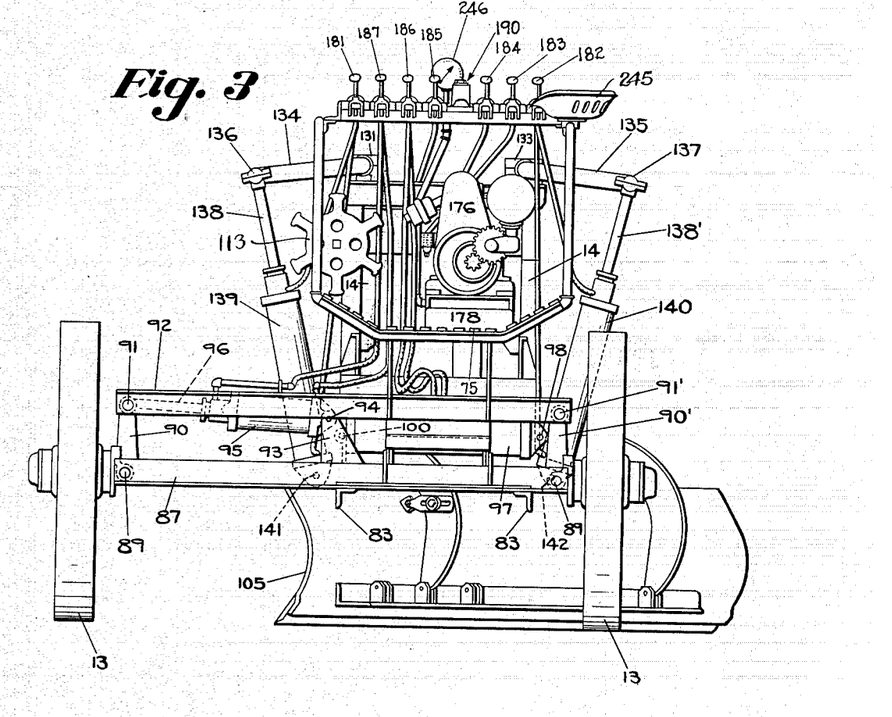
Fig. 3 is a rear elevation of the machine shown in Fig. 1.

Secured rigidly to the rear ends of the longitudinal beams 14 is a guide frame 82 comprising angle irons 83, 83 as shown in Fig. 3. Guides are provided at 85, 86 for the transverse members 87, 87 of the rear wheel supporting frame. The axles 88, 88 for the rear wheels 13, 13 are pivoted at 89, 89 at the ends of the frame 87. Secured to the rear wheel axles are vertical crank arms 90, 90', the upper ends of which are pivoted at 91, 91' to the cross-piece 92.

A vertical bracket plate 93 is secured to the frame 87 and to its upper end at 94 is pivoted a cylinder 95 of a hydraulic motor comprising a piston rod 96, the outer end of which is pivoted at 91 to the upper end of the crank arm 90 as shown in Fig. 3. The hydraulic motor comprising the cylinder 95 is double acting in that the liquid flows to and from the cylinder 95 on both sides of the piston therein and the controlling valve is such that when it is closed the crank arms 90, 90' would be locked in adjusted positions. The leaning of the rear wheels may therefore be adjusted by means of the hydraulic motor 95 and locked in adjusted position.

In order to shift the rear end of the frame 11 relatively to the rear wheels a hydraulic motor comprising a cylinder 97 may be connected between the frame 11 and the frame 87. As shown in Figs. 2 and 3 the cylinder 97 may be pivoted at 98 to the frame 87 and the piston rod 99 pivoted at 100 to the bracket 101 secured to the rear end of one of the beams 14, 14.

Referring now to the road-working implement comprising a mold board or scraper 105 and the structure for supporting the same, it will be seen that the drawbar 51 comprises spaced-apart members 106, 97 which diverge rearwardly and have secured to the rear portions thereof a supporting circular guide 108 for supporting and guiding the circle frame 109 on which the mold board 105 is mounted. By means of gearing 110 connected by links 111 and universal joints 112 to the wheel 113 at the operator's station, the circle 109 and the mold board 105 may be adjusted angularly relative to the path of travel of the road grading machine. By means of the pull handle 114 connected by the rod 115 to the latch mechanism 116 the mold board may be releasably locked in adjusted angular position. The mechanism for swinging the mold board on a vertical axis to adjust the angularity thereof, and the releasable latch mechanism 116, are of well-known construction.

It should be understood that the circular guide frame 108 is rigidly secured to the longitudinal members 106 and 107 of the drawbar 51 and therefore this circular frame 108 moves bodily with the drawbar, and the mold board 105 moves bodily with the guide frame 108 and the drawbar 51.

To diametrically opposite sides of the circular guide frame 108 are connected by means of universal joints 117 and 118 the lower ends of extensible hanger rods 119 and 120. Each hanger rod comprises a lower rod 121 telescoping into a pipe rod 122. Holes 123, 123 in the pipe 122 are adapted to register with a transverse hole in the rod 121 and a pin relied on to connect the rod 121 to the pipe 122 after the length of the hanger has been adjusted. While in Fig. 1 provision is made for two different lengths of the hanger 119 there may be more than two holes 123 if desired.

The upper ends of the hangers 119 and 120 are connected by the universal joints 124 and 125 to the crank arms 126 and 127 which extend laterally from the longitudinal rockshafts 128 and 129. The rockshafts are mounted in suitable bearings 130, 131 and 132, 133 on the tops of beams 14, 14 and spaced above the same a sufficient distance to afford ample clearance between the cranks 126 and 127 and the main frame 11 when such cranks are swung downwardly. To the rear ends of the rockshafts 128 and 129 are connected the laterally extending crank arms 134, 135 which are connected at their outer ends by means of universal joints 136, 137 to the upper ends of the piston rods 138, 138' which extend downwardly into the cylinders 139 and 140 of hydraulic motors mounted on opposite sides of the rear portion of the frame 11 as shown in Figs. 2 and 3. The lower ends of the cylinders 139 and 140 are pivoted at 141, 142 to brackets depending from the beams 14.

The hydraulic motors comprising the cylinders 139 and 140 are preferably double acting under control of valves located at the operator's station. Consequently, when the mold board has been adjusted it may be locked in adjusted position against both up and down movements.

The mold board may be shifted laterally relatively to the frame 11 by means of the hydraulic motor comprising the cylinder 144 and connections between the same and the rear end of the drawbar 51. The upper end of the cylinder 144 is pivoted at 145 to a bracket 146 mounted on the cross-tube 17 as shown in Figs. 1 and 2.

The piston rod 147 is connected to a rack bar 147' which is guided by a roller 148 and which meshes with the pinion 149 secured to a shaft to the lower end of which is secured a gear 151 meshing with the transverse rack bar 152. The rack bar 152 is supported by and guided along a transverse rail 150 secured to the lower sides of the beams 14 as shown in Fig. 1.

Between a pair of lugs 153 is pivoted at 154 a clevis 155 and the latter is pivoted on an upright axis to a rod 156 which is adapted to slide in the longitudinal guide 157 on the bottom of the plate 158. The plate 158 is pivoted at 159 to the cross-piece 160 of a semi-circular frame at the center of the arcuate member 161 thereof. This arcuate member is provided with a plurality of notches 162 for receiving the latch mechanism 163.

A semi-circular frame comprising the cross-piece 160 and the arcuate member 161 is pivoted at 164 to the rear end of the drawbar 51. The latch mechanism may be released manually and the motor 144 operated to move the rack 152 along the guide 150 and thus snap the latch mechanism into another notch 162. Then upon reversing the motor 144, power may be applied to shift the mold board laterally relative to the machine frame 11.

It should be understood that the shifting of the mold board laterally and the adjustment thereof vertically may be effected by hydraulic motor mechanism entirely. The construction is such that the mold board may be moved by means of the hydraulic motor mechanism to high-lift or bank-sloping position on either side of the machine. Since the hydraulic motors are double acting they may be relied upon to lock the mold board at adjusted elevation whether occupying a horizontal position or occupying a high-lift or bank-sloping position.

The internal combustion engine 176 and the pump 177 to which it is connected, are mounted on suitable supporting framework at the rear end of the machine frame 11 as shown in Fig. 3. The fluid-pressure medium, such as oil, is drawn from the supply tank 178 by the pump 177 and forced through the various pipes or conduits shown in Figs. 8 and 9.

The valves for the respective hydraulic motors are banked in a single position adjacent to the operator's station at the platform 75 which is located at the rear end of the machine. Inasmuch as the machine shown in Fig. 1 includes six adjusting hydraulic motors and one double steering hydraulic motor mechanism, I have shown seven controlling valves each having the construction shown in Fig. 7 and each comprising a valve housing 179' mounted on a manifold 179. Each valve may be manually operated by means of a handle 180. By referring to Figs. 2 and 5 it will be seen that the end knobs 181 and 182 may be connected to levers for operating valves to control the motors 139 and 140. The knob 183 may be connected to the front leaning wheel motor 26 through pipes corresponding to pipes 67 and 68 and positioned behind these pipes as viewed in Fig. 1. One of the pipes connecting knob 183 and motor 26 is shown at 64' in Fig. 2, the corresponding pipes being beneath pipe 64' in Fig. 2 and therefore not visible. The knob 184 may be connected to the valve for controlling the motors 37 and 38 to operate them in opposite directions so that whenever the piston rod 37' is moved in one direction, the other piston rod 38' may be moved in the opposite direction.

The knob 185 may be connected to the valve for controlling the motor 144. The knob 186 may be connected to the valve for controlling the rear shifting motor 97. The knob 187 may be connected to the valve for controlling the rear leaning wheel motor 95.

The rotary gear pump 177 is connected by means of the suction pipe 188 to the supply tank 178. Since the pump 177 is operated continuously by the internal combustion engine the liquid is under pressure in the pipe 189. Inasmuch as it is desirable to operate the pump at substantially no load when all of the motor controlling valves are closed, a regulating valve device 190 is connected between the supply pipe 189 and the tank 178 by means of the branch pipes 191 and 192 as shown in Figs. 8 and 9.

Figure 8:
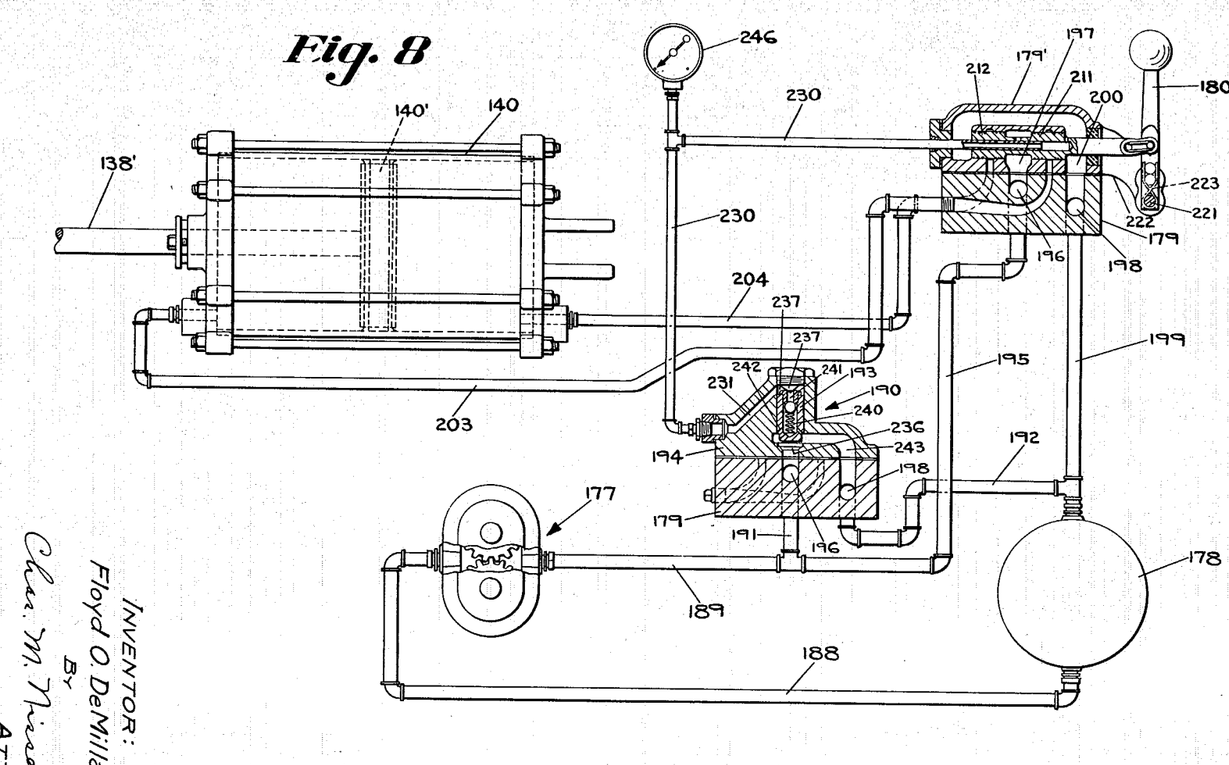
Fig. 8 is a diagrammatic view of the piping and shows the parts in their positions when the manually controlling valves are closed and the pump is operating at substantially no load.
Figure 9:
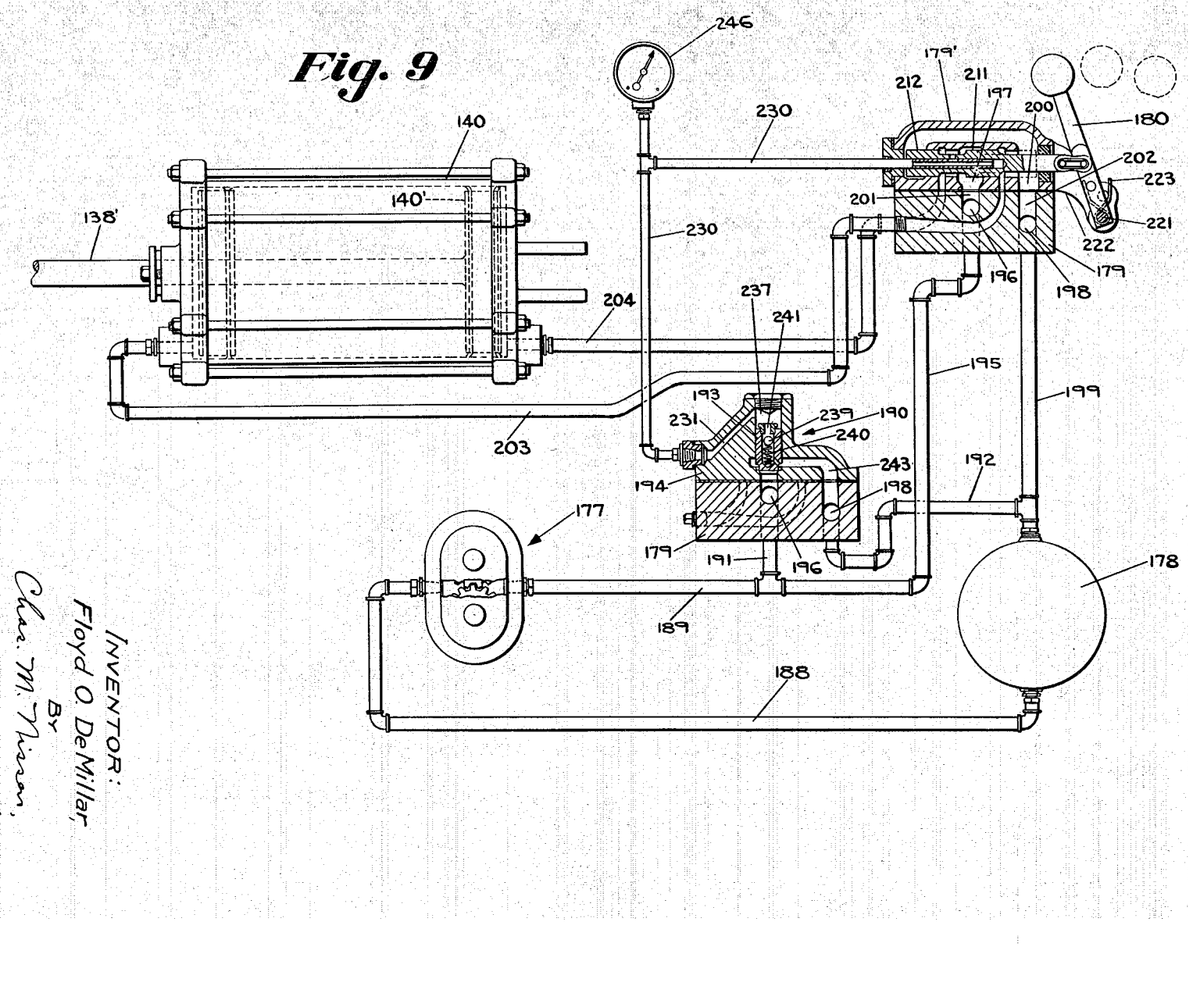
Fig. 9 is a diagrammatic view similar to that shown in Fig. 8 illustrating the positions of the parts when the hydraulic motor piston reaches the end of its stroke and the liquid is being by-passed through the automatic valve while the main valve is still open.

Assuming that the manually operated controlling valves on the manifold 179 at the operator's station are all closed, the valve 193 in the valve block 194 will be in open position as shown in Fig. 8 permitting the liquid from the supply pipe 189 to flow through the branch pipes 191 and 192 into the tank 178 at very little or no load on the pump and consequently the pump may be operated continuously with the consumption of a minimum amount of fuel during operation of the road grader with the various devices thereon locked and held in adjusted positions. It should be understood that the valve 193 is held in the open position shown in Fig. 8 with very little hydraulic pressure since I have eliminated the ordinary spring-pressed check valve across a pump which requires the latter to operate under considerable pressure when no hydraulic motor is active.

Figure 7:
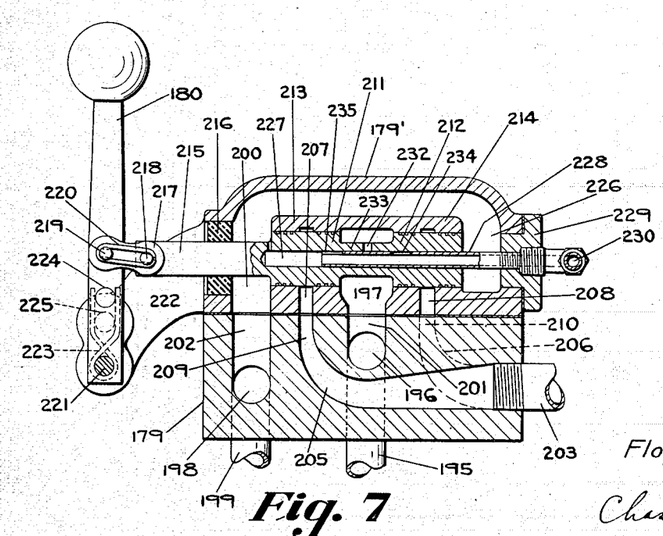
Fig. 7 is a sectional elevation of one of the manually operated valves taken on the line 7—7 of Fig. 5 looking in the direction of the arrows.

The supply pipe 195 as shown in Fig. 8 is connected to the longitudinal horizontal passageway 196 which extends along the longitudinal center line of the manifold 179. The lower side of each of the valve housings 179' is provided with a port 197 which communicates with the common supply passageway 196 in the manifold 179. A common exhaust or return passageway 198 extends longitudinally of the manifold block 179 as shown in Fig. 7 and communicates with the return pipe 199 which is connected to the supply tank 178 as shown in Fig. 8. Each of the valve housings 179' is provided with a port 200 in communication with the return passageway 198. The lower ports 197 and 200 in the bottom of the valve housing 179' may respectively communicate with the passageways 196 and 198 by means of vertical ports 201 and 202 extending from the top of the manifold block 179 to the longitudinal passageways 196 and 198 as shown in Fig. 7.

Figures 5, 6:
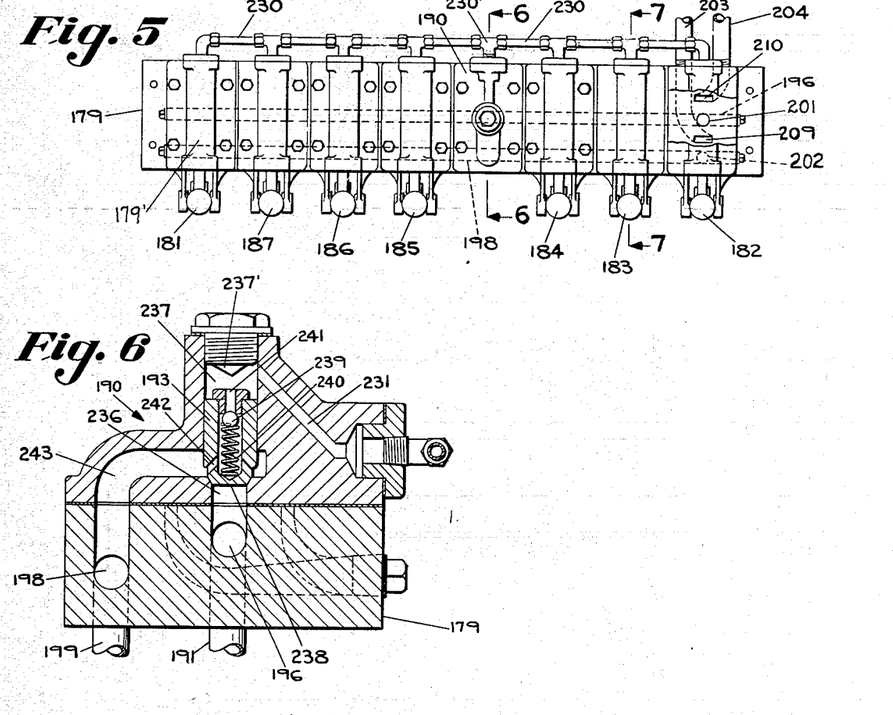
Fig. 5 is a plan view of the manifold with the automatic valve and the manually operated valves mounted thereon.
Fig. 6 is a sectional elevation of the automatic valve taken on the line 6—6 of Fig. 5 looking in the direction of the arrows.

Extending from each of the adjusting motors and the pair of steering motors is a pair of pipes which are connected to the manifold block 179 as shown in Figs. 5 and 7. For instance, the motor 140 has connected to the ends thereof a pair of pipes 203 and 204 which are connected to the manifold block 179 to communicate with passageways 205 and 206 in the manifold block 179 so as to register with the ports 207 and 208 in the bottom of the valve housing 179'. The ports 207 and 208 register respectively with the ports 209 and 210 in the top of the manifold block 179.

It will thus be seen that when the valve is closed as shown in Fig. 7 all communication is cut off between the supply pipe 195 and the return pipe 199 and so also between the supply pipe 195 and the hydraulic motor pipes 203 and 204.

The valve shown in Fig. 7 comprises two pistons 211 and 212 mounted in slide bearings 213 and 214 which may be integral with the valve housing 179'. A valve rod 215 slides through a bearing 216 of composition material, which has a water tight fit in an opening in the left-hand end of the housing 179' as viewed in Fig. 7. A link 217 is pivotally connected at 218 to the outer end of the valve rod 215 and is also pivotally connected at 219 to the lever 180. A split loop-shaped retainer 220 may be placed on the pins 218 and 219 to hold the link 217 in place.

The lever 180 is pivoted at 221 to the lower end of a bracket arm 222 which is secured to the valve housing 179'.

The centering mechanism for the valve mechanism shown in Fig. 7 comprises a spring 223 supported on the pivot 221. This spring has two arms which extend upwardly to engage opposite sides of the pin 224 on the lever 180 and the opposite sides of the stationary pin 225 secured to the bracket 222. When the lever 180 is moved forwardly or rearwardly the valve mechanism is opened to direct pressure on one side or the other of the piston in the cylinder to which the pipes 203 and 204 are connected. For instance, if the lever 180 is moved in a clock-wise direction as viewed in Fig. 7, the pistons 211 and 212 will be moved toward the right to completely open the ports 207 and 208, whereupon supply pressure will be established between the supply pipe 195 and the pipe 204 and the pipe 203 will be placed in communication through the port 207 with the return pipe 199. If the pipe 204 is connected to the upper end of the cylinder 140 such opening of the valve mechanism shown in Fig. 7 will exert pressure on the top of the piston in the cylinder 140 and the liquid below such piston will flow out through the pipe 203 to the discharge pipe 199. When the lever 180 is released the spring 223 acts on the pin 224 to return the lever 180 to its vertical position and consequently the valve will be automatically closed and such closure will lock the piston in the cylinder 140 against movement in either direction. Therefore, when the valve is closed the mold board will be locked in adjusted position.

When the lever 180 is moved in an anti-clockwise direction as viewed in Fig. 7 the pistons 211 and 212 will be moved to the left to completely open the ports 207 and 208, whereupon the supply pipe 195 will be connected to the pipe 203 and the pipe 204 will be connected through the passageway 226 to the port 200 and thence to the discharge pipe 199. Again, when the lever 180 is released the spring 223 acts to automatically close the ports 207 and 208, thereby locking the piston in the cylinder to which the pipes 203 and 204 are connected.

The valves to which the actuating knobs 181, 182, 183, 184, 185, 186 and 187 are connected each individually control a motor except in the case of the steering mechanism in connection with which one valve controls the operation of the two motors 37 and 38 in opposite directions.

Each set of valve pistons is provided with a central longitudinal bore 227 which receives the stationary pipe 228 fixed at its right-hand end as shown in Fig. 7 to the cap 229 which in turn is secured in an opening in the right-hand end of the housing 179' as viewed in Fig. 7, with a liquid tight fit.

The outer end of the stationary tube 228 is connected to a pipe 230. The latter is in communication with all of the stationary pipes in the various valves mounted on the manifold block 179, as shown in Fig. 5. A T-coupling 230' also connects the pipe 230 with the passageway 231 in the regulating valve block 194 as shown in Figs. 8 and 9.

When the lever 180 is in its extreme right-hand position the port 232 in the connector 233 between the pistons 211 and 212 registers with the port 234 in the tube 228, thereby establishing communication between the supply pipe 195 and the passageway 231 in the pressure regulating device 190 through the pipe 230. In the same manner, when the lever 180 is in its extreme left-hand position the port 232 registers with the port 235 in the tube 228. It will thus be seen that whenever the valve mechanism shown in Fig. 7 is in either of its wide-open positions the supply pipe 195 communicates with the passageway 231 in the regulating device 190.

Assuming that the pump 177 is being continuously operated and the controlling valve 211, 212 is in closed position as shown in Fig. 8, the return flow pressure in the pipes 191 and 192 although very low to enable the pump to operate at substantially no load, will be sufficient to hold the valve 193 in its upper position with the port 236 wide open. When the valve shown in Fig. 7 and in the upper right-hand corner of Fig. 8 is moved to open position, sufficient pressure will be exerted through the pipe 195, ports 232, 234 or 235, pipes 228, 230, and passageway 231, to act on the upper side of the valve 193 to cause the latter to move down and close the port 236. Since the return flow pressure while the port 236 and the manually operated valve mechanism are open, is substantially the same at both ends of the valve 193, the latter will fall by gravity to close the port 236 and as soon as this happens the area on top of the valve 193 in the chamber 237 will be greater than the area of the lower end 238 of the valve 193 as viewed in Fig. 6. That is to say, after the port 236 is closed the hydraulic pressure exerted on the lower end of the valve 193 is less than the hydraulic pressure exerted on the upper end thereof. Therefore, as soon as the valve 193 closes the port 236, pressure will be built up by continued operation of the pump 177 to effect movement of the piston 140' in the cylinder 140. The pressure regulating device 190 therefore operates automatically as soon as one of the manually operated valves is opened to close the communication between the return pipes 191 and 192 and compels the pump 177 to force the liquid under operating pressure into one end or the other of the cylinder 140. It should be understood that only one regulating device 190 need be used for a plurality of motors and manual controlling valve devices. For instance, in Fig. 5 I have shown one hydraulic pressure regulating device 190 and seven manually operated valve devices.

When the piston 140' reaches the end of its stroke and the manually operated valve is still in open position, the pressure on the piston 140' will be limited by the ball check valve mounted in the valve 193. This ball check valve comprises a ball 239 urged by a spring 240 to close the auxiliary port 241 in the upper end of the valve 193. The strength of the spring 240 is such that the port 241 will remain closed so long as a predetermined operating pressure is exerted in the cylinder 140. If the mold board should meet an obstruction or if the piston in the cylinder reaches either limit of its stroke, the pressure in the cylinder will be limited by the opening of the port 241, whereupon the flow of liquid will be by-passed through the pipe 230, the passageway 231, the port 241, the central bore in the valve 193, the inclined openings 242 in the lower end of the valve 193, into the passageway 243 and thence into the return pipe 199. During such by-passing of the liquid the port 236 is maintained closed and sufficient pressure continues to be exerted in the cylinder 140 to hold the mold board in adjusted position and when the operator releases the lever 180 the valve 211, 212 will be automatically closed and the piston 140' locked against return movement. But the hydraulic pressure in the pipe 230 may at any time be determined by the operator at his station by observing the pressure gauge 246 shown in Figs. 3, 8 and 9.

After the ball check valve has been opened as illustrated in Fig. 9 and the manually operated valve is closed, assuming that all of the other manually operated valves are also closed, the pressure in the pipe 230 from the pump 177 is cut off. As soon as this occurs, an impulsive force on the lower end 238 of the valve 193 will move the latter upwardly while the liquid in the chamber 237 escapes past the ball 239 into the central bore of the valve 193, and after the port 236 is fully opened by such impulsive force the check valve ball 239 will automatically close the port 241, whereupon the hydraulic pressure necessary to hold the valve 193 against the cone abutment 237' in the position shown in Fig. 8 will be reduced to such a low value that the pump 177 may be said to be able to continuously operate at substantially no load while the hydraulic motors on the road grader are inactive.

By referring to Figs. 1 and 2 it will be noted that the manifold block 179 constitutes a crosspiece of the frame 204 on which the operator's seat 245 is mounted. The framework of the road grading machine is of such open construction that the operator at the station 75 on the rear end of the machine may always have under his observation the adjustments which he is effecting by operation of the manual valves mounted on the manifold 179. The piping connections between the banked valves and the hydraulic motors are all direct, with the conduits between the valves and the motor cylinders free and unobstructed. The valves may always be moved very accurately to full open positions in either direction and the centering springs 223 relied on to always accurately move the valves back to central positions where they will fully close all of the ports between the supply pipe 195 and the discharge pipe 199. The piping connections between the pump and the manual valves and between the latter and the hydraulic motors are always completely filled and therefore whenever a manual valve is opened the motor to which it is connected will be immediately responsive.

The capacity of the pump 177 is preferably such as to enable the operator to effect the operation of a plurality of hydraulic motors at the same time. For instance, he may control the leaning of the front and rear wheels simultaneously by means of the motors 26 and 95. Furthermore, he may in adjusting the mold board to a high-lift or bank cutting position, operate the motors 139, 140 and 144 at the same time.

Pressure gauge 246 may be provided to determine that the pump is operating properly.

While I have shown a pull type grader, it should be understood that my improvements are also applicable to a road grader of the self-propelling type embodying an internal combustion engine as the power plant connected to rear traction wheels.

I do not claim herein broadly means located at a single station for operating valves to control adjusting hydraulic motors distributed in a road-working machine, nor the mechanism herein disclosed for enabling the mold board to operate in high-lift or bank-sloping position, as well as in horizontal position, as such construction is the invention of Franklin E. Arndt and disclosed and claimed in his co-pending application, Ser. No. 654,901 filed February 2, 1933 for an Improvement in road graders. My improvements include the pressure regulating device illustrated in Fig. 6, the manually operated valve structure shown in Fig. 7, the manifold for banking the valves themselves at the single operator's station as illustrated in Figs. 1, 2 and 5, and the adaptation of these structures to road-working machinery to enable the latter to be operated accurately and efficiently and without exerting undue strain thereon, but nevertheless locking the various adjustable parts in adjusted positions and enabling the pump to be operated continuously at substantially no load when the hydraulic motors are inactive so that during the operation of the road-working machine after the adjustments have been made the internal combustion engine for continuously driving the pump will consume a minimum amount of fuel.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In road-working apparatus, the combination with a vehicle, of a motor mounted thereon, mechanism adjustable by said motor, a pump, means for continuously operating said pump, and pump by-pass mechanism comprising a plunger urged to closing position solely by the influence of gravity, said plunger including a reverse check valve device to minimize the shock and jar when said mechanism is stopped in adjusted position.

2. In a road-working machine, the combination with a wheel-supported frame, of an operator's platform thereon, an auxiliary frame on said platform, a fluid pressure pump mounted on said wheel-supported frame, an engine for driving said pump, fluid-pressure motors on said wheel-supported frame, devices connected to said fluid-pressure motors for adjustment thereby, a pressure regulator comprising a valve for controlling a low pressure by-pass for said pump, a plurality of valve structures one for each of said fluid pressure motors, means comprising a manifold serving as a forward cross-piece for said auxiliary frame to afford a support for said valve structures and said pressure regulator and to also afford fluid pressure conduits for said by-pass and said motors and said valve structures, and means connected between said pressure regulator and each valve structure to effect automatic closure of said low-pressure by-pass when any one of said valve structures is moved to position to effect operation of its corresponding motor.

3. In a road-working machine, the combination with a wheel-supported frame, of a plurality of fluid-pressure motors mounted thereon, a plurality of operating valves, one for each of said motors, a manifold for affording passageways to said valves and for banking said valves adjacent to the operator's station, a pump, an engine for operating the pump continuously, a low pressure by-pass for enabling said pump to idle at substantially no load, a delivery conduit between said pump and said manifold, a pressure regulator comprising a valve biased to a by-pass closing position for controlling said low-pressure by-pass, and means connected between said pressure regulator and said operating valves for causing said by-pass valve to close the by-pass when one of said operating valves is moved to position to effect operation of its corresponding motor and for causing said by-pass valve to open said by-pass when such operated valve is moved back to initial position.

4. In a road building machine, the combination with a vehicle, of road working apparatus mounted thereon, a plurality of fluid pressure motors for effecting adjustments of said road working apparatus, a pump, an engine connected to the pump to operate the same, a plurality of separate valve structures one for each of said motors, an integral manifold block affording support for said valve structures in banked relation and also affording passageways for connections between the pump and said valve structures and between the latter and said motors, means for separately securing said valve structures to the outside of said manifold block with the ports in each valve structure establishing communication with predetermined passageways in said manifold block, and a plurality of valve actuating devices one for each of said valve structures and each within reach of the operator at a single station on the vehicle.

5. In a one-man hydraulic road grader, the combination with a wheeled supporting frame, of hydraulically operated mechanism for steering the machine, hydraulically operated mechanism for leaning the wheels of the machine, hydraulically operated mechanism for shifting the rear end of the frame relatively to the rear wheels, a hydraulic pump connected to the aforesaid hydraulically operated mechanisms, a platform on said frame for the operator, controlling valves for said hydraulically operated mechanisms, means for supporting said controlling valves in banked position adjacent to said platform, a low pressure by-pass for the pump, a valve for controlling said by-pass, means connected to the supply line for effecting closure of said by-pass valve line when said pump is operatively connected to any of said hydraulically operated mechanisms and to permit opening of said by-pass valve to afford free and unobstructed flow of fluid through said by-pass while said pump is idling and continuously driven but disconnected from all of said hydraulically operated mechanisms.

6. In a road-working machine, the combination with a supporting frame, of a road-working implement mounted thereon, a plurality of motors on said frame to effect various adjustments including adjustment of said road-working implement, a plurality of separate valve structures one for each of said motors and each comprising a valve block having a plurality of ports on its under side, an integral manifold block having longitudinal supply and exhaust passageways and a plurality of pairs of transversely extending passageways one pair for each of said motors, means for detachably securing the separate valve blocks separately to the top of said manifold block with the ports on the undersides of said valve blocks registering with ports leading from said passageways to the top side of said manifold block, and valve actuating devices one for each of said valve structures and within reach of the operator at a single station on the machine.

7. In a road-working machine, the combination with a supporting frame, of road-working apparatus mounted thereon, a plurality of fluid-pressure motors for effecting adjustments of said road-working apparatus, a plurality of controlling valves one for each of said motors, a pump, a low-pressure by-pass for the pump, an automatic valve biased to a closed position for controlling said low-pressure by-pass, and means connected between said automatic valve and all of said controlling valves to effect automatic closure of said automatic valve and the closure of said low-pressure by-pass when any one of said controlling valves connects the pump to its corresponding motor.

8. In a road-working machine, the combination with a supporting frame, of a fluid-pressure motor mounted on said frame for adjusting a part of the machine, said motor comprising a cylinder and a piston, a pump, means for operating said pump continuously, a valve connected between said pump and said motor to control the starting and stopping of the latter to effect such adjustment, a supply reservoir, a low-pressure by-pass between the pump and said reservoir, an automatic valve for controlling said by-pass, means operative upon movement of said controlling valve to position for starting said motor for effecting automatic closure of said by-pass valve, and means comprising said automatic valve for effecting by-passing of the fluid when the piston reaches the end of its stroke and said controlling valve remains in operating position.

9. A road working machine comprising the combination with a supporting frame, of a steering wheel for guiding and supporting said machine, a hydraulic motor for operating said steering wheel to effect a steering operation, a pump, means for operating said pump continuously, means including a valve connected between the pump and the motor for controlling the starting and stopping of the latter, a pressure regulator comprising a valve biased to a closing position for controlling a by-pass around said pump, said by-pass being free and unobstructed when said last-named valve is open and the pump is idling, and means for effecting automatic closure of said by-pass valve, said means comprising a conduit connected to the pump pressure supply line when said first-named valve is in a position to effect operation of said motor.

10. A road working machine comprising the combination with a wheeled supporting frame including a steering wheel, of a hydraulic motor system for adjusting said wheel to a desired position and maintaining it in an adjusted position, said system comprising, a hydraulic motor, a pump, means for operating said pump continuously, conduits connecting said motor and said pump, a motor control valve interconnected between said motor and said pump by said conduits, said valve being effective in its neutral position to trap fluid in both the intake and outlet of said motor and to disconnect effectively said motor and said pump, said valve being operative to connect said motor and pump for operation of the former when moved from its neutral position to an operative position, a by-pass around said pump, a by-pass valve for controlling said by-pass which valve is biased to by-pass closing position by gravity but is maintained open by the pressure supplied by said pump when said motor control valve is in neutral position whereby said pump will operate at substantially no-load, and means comprising a fluid-pressure conduit leading from said motor control valve to said by-pass valve adapted to effect closure of said by-pass valve when said motor control valve is moved to an operative position.

11. A road working machine comprising the combination with a frame, of a pair of rear wheels for supporting said frame, a hydraulic motor system for adjusting said wheels laterally and maintaining them in a desired position, said system comprising, a hydraulic motor, a pump, means for operating said pump continuously, conduits connecting said motor and said pump, a motor control valve interconnected between said motor and said pump by said conduits, said valve being effective in its neutral position to trap fluid in both the intake and outlet of said motor and to disconnect effectively said motor and said pump, said valve being operative to connect said motor and pump for operation of the former when moved from its neutral position to an operative position, a by-pass around said pump, a by-pass valve for controlling said by-pass which valve is biased to by-pass closing position by gravity but is maintained open by the pressure supplied by said pump when said motor control valve is in neutral position whereby said pump will operate at substantially no-load, and means comprising a fluid pressure conduit leading from said motor control valve to said by-pass valve adapted to effect closure of said by-pass valve when said motor control valve is moved to an operative position.

12. A road working machine comprising the combination with a frame, of a pair of rear wheels for supporting said frame, a hydraulic motor system for tiltably adjusting said wheels about a horizontal axis and maintaining them in a desired position, said system comprising, a hydraulic motor, a pump, means for operating said pump continuously, conduits connecting said motor and said pump, a motor control valve interconnected between said motor and said pump by said conduits, said valve being effective in its neutral position to trap fluid in both the intake and outlet of said motor and to disconnect effectively said motor and said pump, said valve being operative to connect said motor and pump for operation of the former when moved from its neutral position to an operative position, a by-pass around said pump, a by-pass valve for controlling said by-pass which valve is biased to by-pass closing position by gravity but is maintained open by the pressure supplied by said pump when said motor control valve is in neutral position whereby said pump will operate at substantially no-load, and means comprising a fluid pressure conduit leading from said motor control valve to said by-pass valve adapted to effect closure of said by-pass valve when said motor control valve is moved to an operative position.

FLOYD O. DE MILLAR.